(12) United States Patent
Grasser et al.

(10) Patent No.: US 6,902,129 B2
(45) Date of Patent: Jun. 7, 2005

(54) SEAT BELT DEVICE

(75) Inventors: Thomas Grasser, Illerrieden (DE); Robert Fleischmann, Neu-Ulm (DE); Stefan Lambrecht, Unterelchingen (DE); Jochen Benz, Sontheim (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 0 days.

(21) Appl. No.: 10/632,093

(22) Filed: Aug. 1, 2003

(65) Prior Publication Data

US 2004/0104293 A1 Jun. 3, 2004

(30) Foreign Application Priority Data

Aug. 7, 2002 (DE) .......................................... 102 36 858

(51) Int. Cl.⁷ .......................... B60R 22/38; B60R 22/41
(52) U.S. Cl. .................................. 242/383.1; 242/383.2
(58) Field of Search ........................... 242/383.1, 383.2, 242/383.5, 384.1; 280/806; 297/478

(56) References Cited

U.S. PATENT DOCUMENTS

| 4,177,962 | A |   | 12/1979 | Hildebrandt |            |
|-----------|---|---|---------|-------------|------------|
| 5,301,894 | A | * | 4/1994  | Imai        | 242/383.5  |
| 5,348,248 | A | * | 9/1994  | Butenop     | 242/383.2  |
| 5,775,620 | A |   | 7/1998  | Jabusch et al. |         |
| 5,794,879 | A |   | 8/1998  | Huber       |            |
| 5,921,496 | A | * | 7/1999  | Matsuki et al. | 242/383.2 |
| 6,045,194 | A |   | 4/2000  | Kielwein et al. |        |
| 6,305,633 | B1 |  | 10/2001 | Asagiri et al. |         |
| 2002/0018120 | A1 | | 2/2002 | Kogura et al. |          |

FOREIGN PATENT DOCUMENTS

EP        0 273 584       * 7/1988   ............... 242/383.1

* cited by examiner

*Primary Examiner*—John M. Jillions
(74) *Attorney, Agent, or Firm*—Foley & Lardner LLP

(57) ABSTRACT

A seat belt device is provided. The seat belt device has a seat belt roller together with a locking device for locking the seat belt roller. The seat belt device furthermore has a guide pin which is moveably supported inside a guide link and is coupled to the locking device. The displacement of the guide pin inside the guide link depends on the direction of movement of the seat belt roller. The coupling of the pin to the locking device provides that locking of the seat belt roller is either brought about or prevented, according to the positioning of the guide pin in the guide link. The seat belt device makes it possible to ensure that seat belt locking is activated only when unreeling, and not when the set belt is being reeled in.

13 Claims, 9 Drawing Sheets

SEAT BELT DEVICE

BACKGROUND

The invention relates to a seat belt device.

Seat belt devices having seat belt locks, which serve to lock the belt if it is unreeled jerkily are known. Such seat belt locks typically have a locking element, which engages with the frame of the seat belt device if the belt is unreeled jerkily.

In such seat belt devices, however, uncontrolled engagement of the locking element in the frame of the seat belt device has also been observed in the event of a rapid belt return, i.e., the case of rapid belt reeling.

Such seat belt devices typically comprise a large number of components, and thus are costly and expensive to design and-manufacture.

A further disadvantage of such known seat belt devices is that they may exhibit poor response characteristics, i.e., both the engagement travel and engagement times prior to locking of the belt spindle are long.

Furthermore, such seat belt devices often generate a high level of noise.

SUMMARY OF THE INVENTION

One object of the present invention is to address one or more of these above-mentioned problems.

According to an embodiment of the invention, a seat belt device for a vehicle having a seat belt is provided. The seat belt device includes a seat belt roller rotatably fixed to the belt frame of the vehicle for reeling and unreeling of the seat belt, a first locking device for locking the seat belt roller in relation to the belt frame of the seat belt, and a guide pin which is coupled to the locking device and which is moveably guided inside a guide link between a first position and a second position, the seat belt roller being locked in relation to the belt frame in the first position, and wherein locking of the seat belt roller in relation to the belt frame is prevented in the second position.

According to an aspect of the invention, the guide pin serves to ensure that the seat belt roller locks only in the event of jerky unreeling of the belt, not in the event of jerky reeling. The guide pin may be moved into the first position or the second position according to the direction of rotation of the seat belt roller. Unwanted locking of the seat belt roller can thereby be prevented solely by means of the direction of rotation. In particular, the guide pin may be moved into the first position when the seat belt is being unreeled and into the second position when the seat belt is being reeled in.

According to an aspect of the invention, shifting of the guide pin into the second position is preferably brought about by the moments of inertia of the first locking device and/or the guide pin occurring during the rotation of the seat belt roller. In this manner, the forces acting during rotation of the seat belt roller are utilized to bring about a movement of the guide pin into the second position.

According to another aspect of the invention, the guide link may have some free travel in which the guide pin assumes the said second position. On assuming this position a change in the condition of the first locking device is generally prevented.

According to another aspect of the invention, the guide link may run perpendicular to the axis of rotation of the seat belt roller. Arranging the guide link perpendicular to the axis of rotation allows the centrifugal forces generated during the rotation of the guide roller to be utilized to the fullest in shifting the guide pin into the second position. The guide link may comprise a longer link section and a shorter link section essentially perpendicular thereto, where the first position is situated at the end of the longer section opposite the junction of the sections, and the second position is situated at the end of the shorter section opposite the junction of the sections. The longer link section therefore serves to shift the guide pin into the first position, thereby locking the seat belt roller. The shorter link section serves to shift the guide pin into the second position, in which locking of the seat belt roller is prevented. The necessary forces are in both cases produced by rotation of the seat belt roller. Making the sections run perpendicular to one another provides that the forces needed for movement along the respective link sections are optimally decoupled from one another.

According to an aspect of the invention, the seat belt device preferably also has a spring element, which holds the first locking device and the coupled guide pin in a rest position. This ensures that once the seat belt roller has come to a standstill, the guide pin does not remain at one of the ends of the link sections, but returns promptly to the rest position in the area of the junction of the two link sections. This guarantees reliable functioning even in the event of repeated, jerky reeling or unreeling of the seat belt at brief intervals.

The spring element may comprise a coil spring or a spring clip.

The first locking device may comprise a retaining pawl, which is capable of engaging in a frame of the seat belt device to lock the seat belt roller.

The seat belt roller may also comprise the following additional features: a flange connected to the seat belt roller and the first locking device; a ratchet wheel rotatably fixed to the belt frame; and a second locking device, coupled to the ratchet wheel, for locking the ratchet wheel in the event of a jerky unreeling of the seat belt, wherein the guide link is provided in the ratchet wheel, and the guide pin, upon locking of the ratchet wheel, is moved along the guide link towards the first position by further rotation of the flange and the first locking device, thereby causing the first locking device to lock the seat belt roller, and wherein the guide pin is moved towards the second position by jerky reeling in of the seat belt, thereby preventing the first locking device from locking the seat belt roller.

The second locking device may comprise a retaining pawl, which engages in a toothing of a wheel rim should a predetermined angular acceleration of the seat belt roller in the belt unreeling direction be exceeded, such that the ratchet wheel is locked in relation to the seat belt roller, and the guide pin inside the guide link is moved into the first position in the event of further rotation of the seat belt roller in relation to the ratchet wheel.

The seat belt device may also further comprise an inertial mass element capable of rotating in relation to the seat belt roller about the seat belt roller axis, wherein the guide link is provided in the inertial mass element, and the inertial mass element is rotated in relation to the seat belt roller, and the guide pin in the guide link is moved from the first position to the second position should a predetermined angular acceleration of the seat belt roller be exceeded.

One advantage of embodiments of the invention is the requirement of fewer parts, so that the effort and cost of manufacture are reduced.

BRIEF DESCRIPTION OF THE DRAWINGS

The invention will now be explained on the basis of exemplary embodiments and with reference to the drawings, in which.

DETAILED DESCRIPTION

Figure 1:
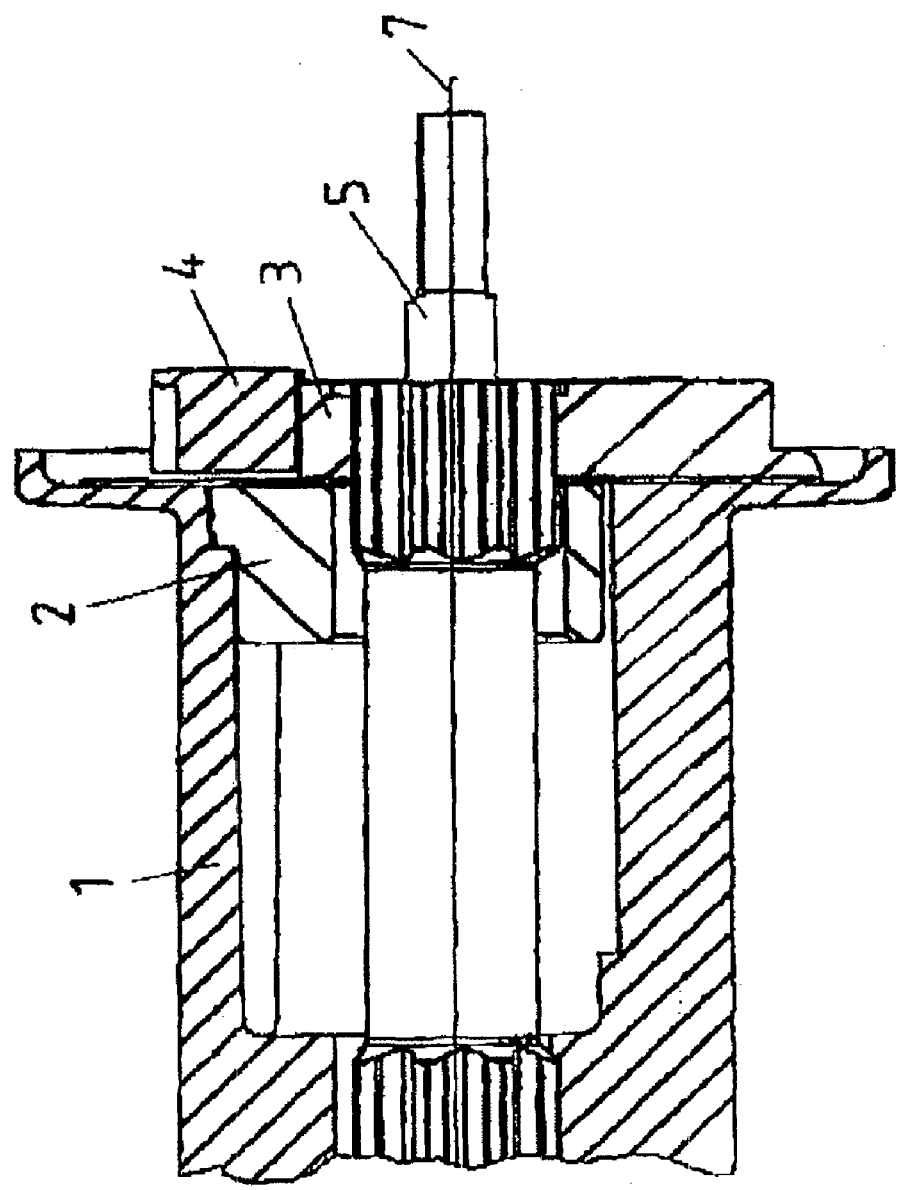
FIG. 1 shows a diagrammatic cross-section through a part of a seat belt device.
Figure 2:
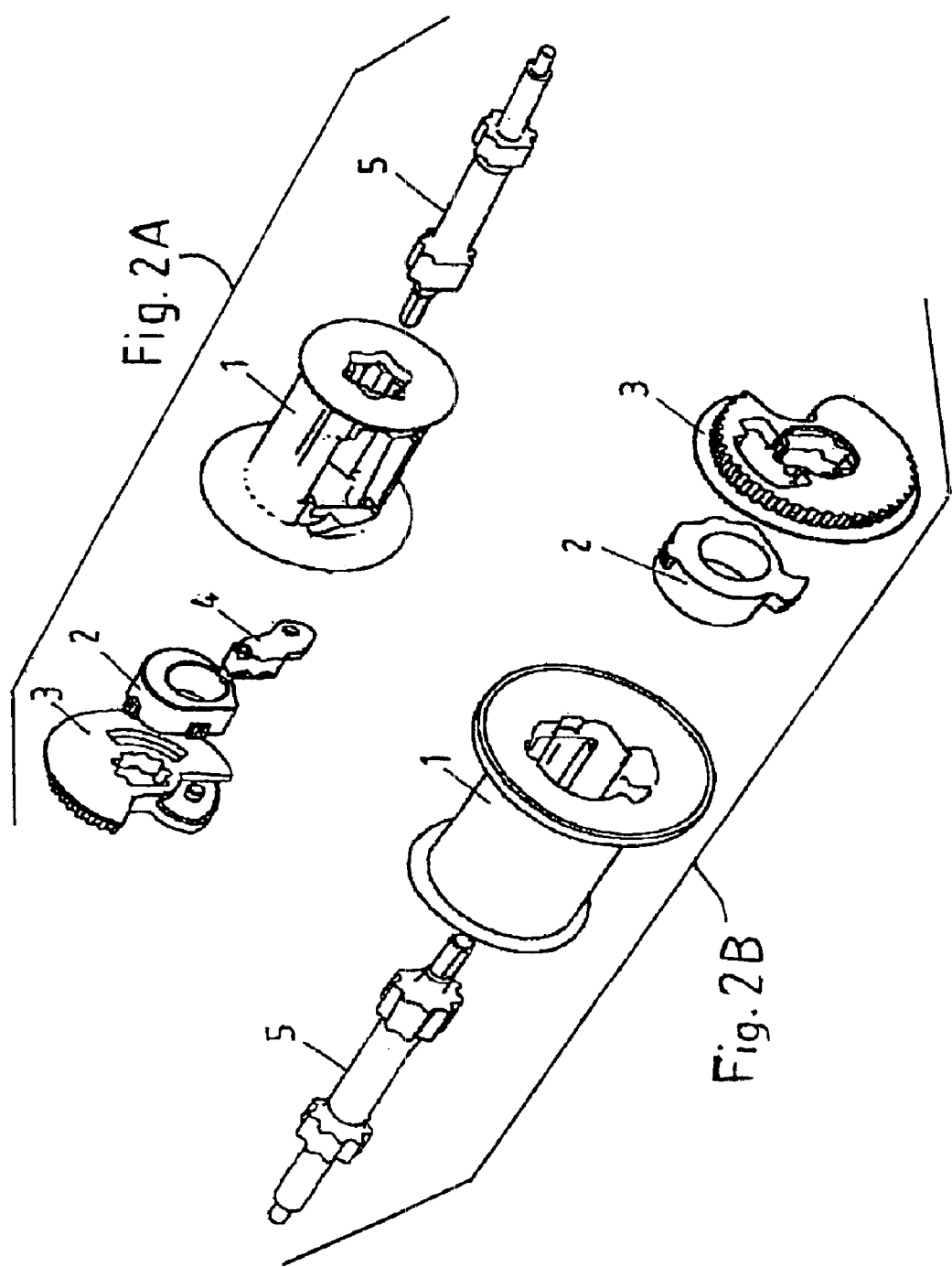
FIG. 2A shows a front perspective view of the components of the part shown in FIG. 1.
FIG. 2B shows a rear perspective view of the components shown in FIG. 2A.

FIG. 1 shows a diagrammatic cross-section through a force limiter for a seat belt system. FIG. 2 shows a perspective view of the components of the limiter. The force limiter comprises a rotatable spindle (or seat belt roller) 1 with a spindle bearing 2, on which a seat belt (not shown) can be reeled and unreeled. A flange 3, rotatable in relation to the spindle 1, is arranged at one end of the spindle 1 situated along its axis of rotation. In addition, a first retaining pawl 4 is provided for arresting the flange in relation to a belt frame, should the seat belt be drawn out jerkily, for example.

A torsion bar 5 is also provided, which has a toothed rim at both ends, by means of which the torsion bar 5 is anchored so that it cannot rotate in corresponding recesses of the spindle 1 and the flange 3 respectively. The torsion bar 5 couples the spindle 1 and the flange 3 together, so that when the limiter is at rest (for example, in the absence of an accident situation) the spindle 1 and the flange 3 can rotate together about an axis of rotation 7, in order to reel the seat belt up on to the spindle 1 or to unreel it therefrom.

Figure 3:
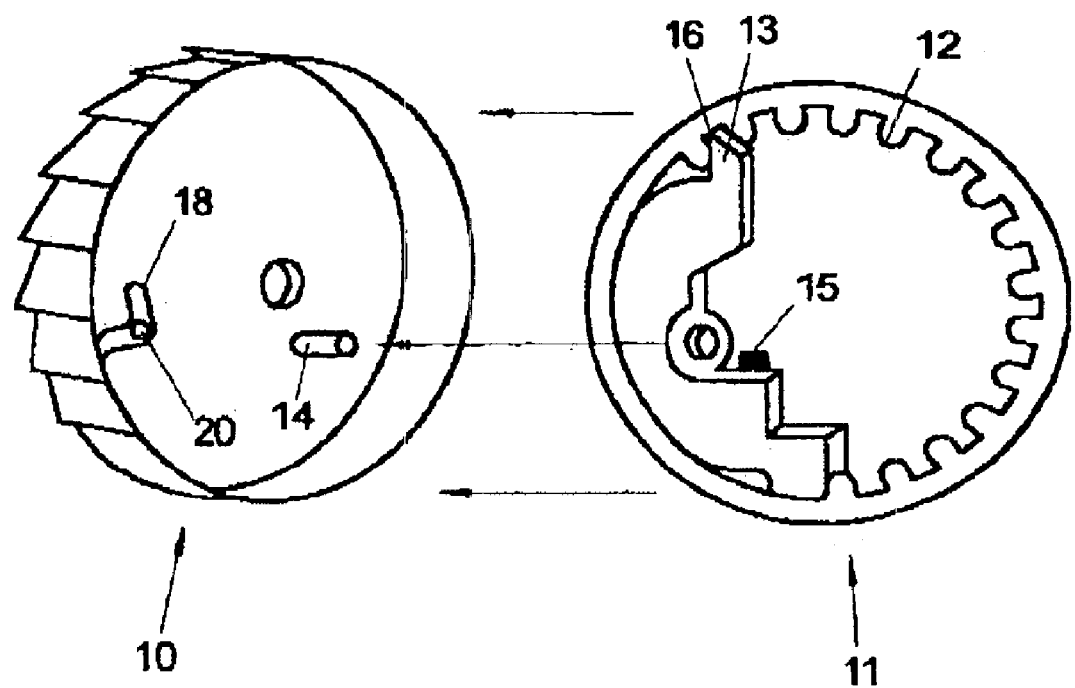
FIG. 3 shows a diagrammatic perspective view of further parts of a seat belt device according to a first exemplary embodiment of the invention.

FIG. 3 shows a diagrammatic perspective view of a ratchet wheel 10 and a wheel rim 11 of a seat belt device according to a first exemplary embodiment of the invention. The wheel rim 11 is mounted on the ratchet wheel 10 as indicated by the arrows. Alternatively, the ratchet wheel 10 may also be mounted on the wheel rim 11.

The wheel rim 11 is locked in relation to the belt frame, while the ratchet wheel 10 is rotatable in relation to the belt frame.

The internal circumferential surface of the wheel rim 11 is provided with teeth 12, with which a second retaining pawl 13 engages, if the seat belt is drawn out jerkily, for example. For this purpose the second retaining pawl 13 is supported so that it can rotate about an axis 14 arranged on the surface area of the ratchet wheel 10. The axis 14 lies outside the center of the circular surface area of the ratchet wheel 10. If the seat belt is drawn out jerkily, the retaining pawl 13 rotates about the axis 14 in opposition to the force of a spring 15, so that the tip 16 of the second retaining pawl 13 engages with the teeth 12 of the wheel rim 11.

The ratchet wheel 10 is connected to the flange 3 by way of a helical extension spring (not shown). In normal operation the ratchet wheel 10 rotates at the same speed as the flange 3. The rotational force is in this case transmitted by the helical extension spring. If the seat belt is drawn out jerkily, the second retaining pawl 13 rotates about the axis 14 and engages with the teeth 12 of the wheel rim 11, as described above. The ratchet wheel 10 connected to the wheel rim 11 is therefore locked in relation to the belt frame. The flange 3 with the first retaining pawl 4 now continues to rotate together with the spindle 1 in opposition to the force of the helical extension spring.

The first retaining pawl 4 is guided in the ratchet wheel 10 by means of a guide pin 20 in a guide link 18. This guide is inoperative as long as the ratchet wheel 10 rotates together with the flange 3. If the ratchet wheel 10 is locked in relation to the belt frame, however, the flange 3 together with the first retaining pawl 4 rotates further in relation to the ratchet wheel 10. The first retaining pawl 4 consequently rotates in relation to the ratchet wheel 10, the orientation of the first retaining pawl 4 during this relative rotation now being determined by the guide link 18. Thus, the first retaining pawl 4 is brought into engagement with the frame of the seat belt device, and therefore prevents any further rotation of the flange 3 and of the spindle 1 connected thereto. The seat belt lock is therefore operative.

Figure 4:
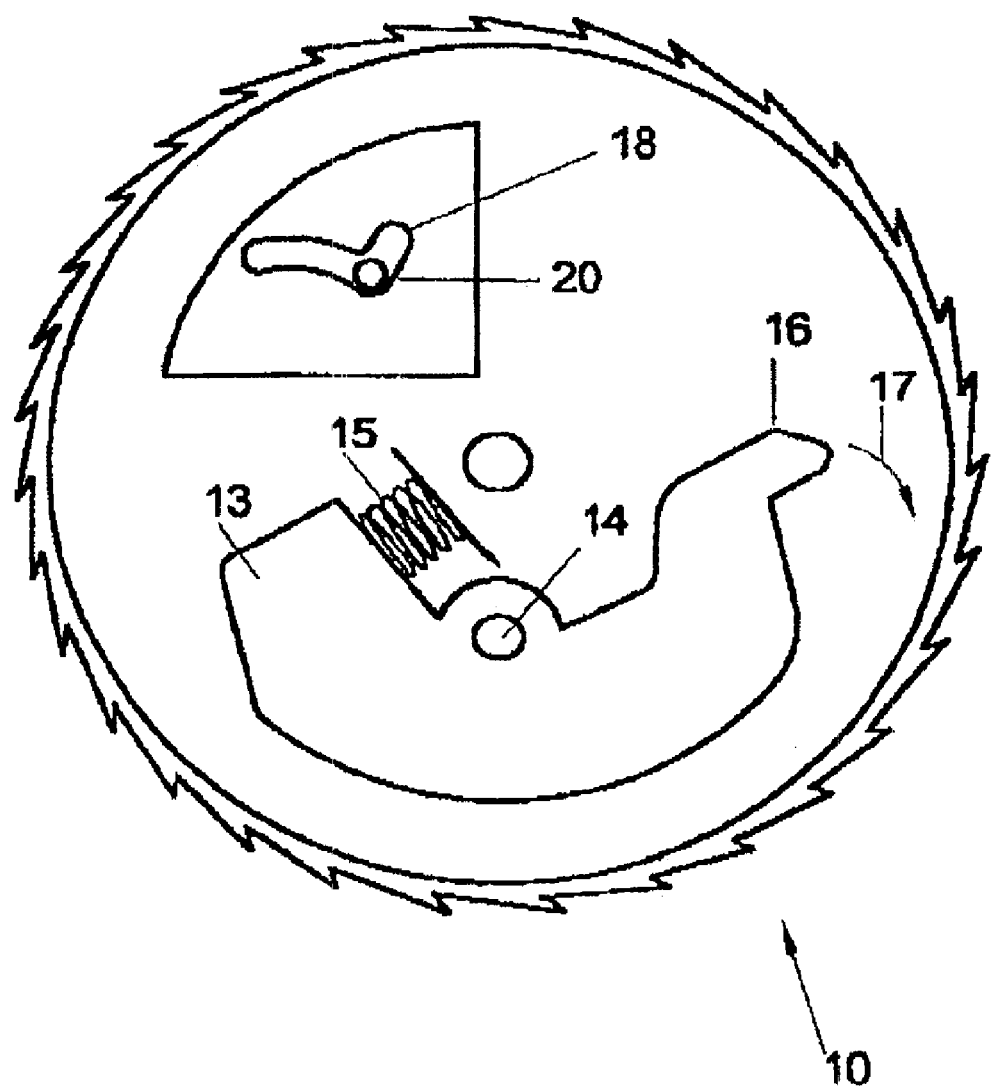
FIGS. 4, 5 and 6 show a diagrammatic top view of the parts shown in FIG. 3 in various states.

FIG. 4 shows a diagrammatic front view of the ratchet wheel 10 with second retaining pawl 13 mounted on the axis 14. An arrow 17 indicates how the tip 16 of the retaining pawl 13 moves outwards when a torque produced by the rotation of the seat belt roller and acting on the retaining pawl 13 is greater than the torque generated by the retaining force of the spring 15.

The guide link 18 can also be seen more clearly from FIG. 4. A guide pin 20, which is connected to the first retaining pawl 4, is guided inside the guide link 18. FIG. 4 shows the guide pin 20 in its rest position. The first retaining pawl 4 and hence the guide pin 20 connected to the first retaining pawl 4 are held in the rest position by a spring element (not shown).

Figure 5:
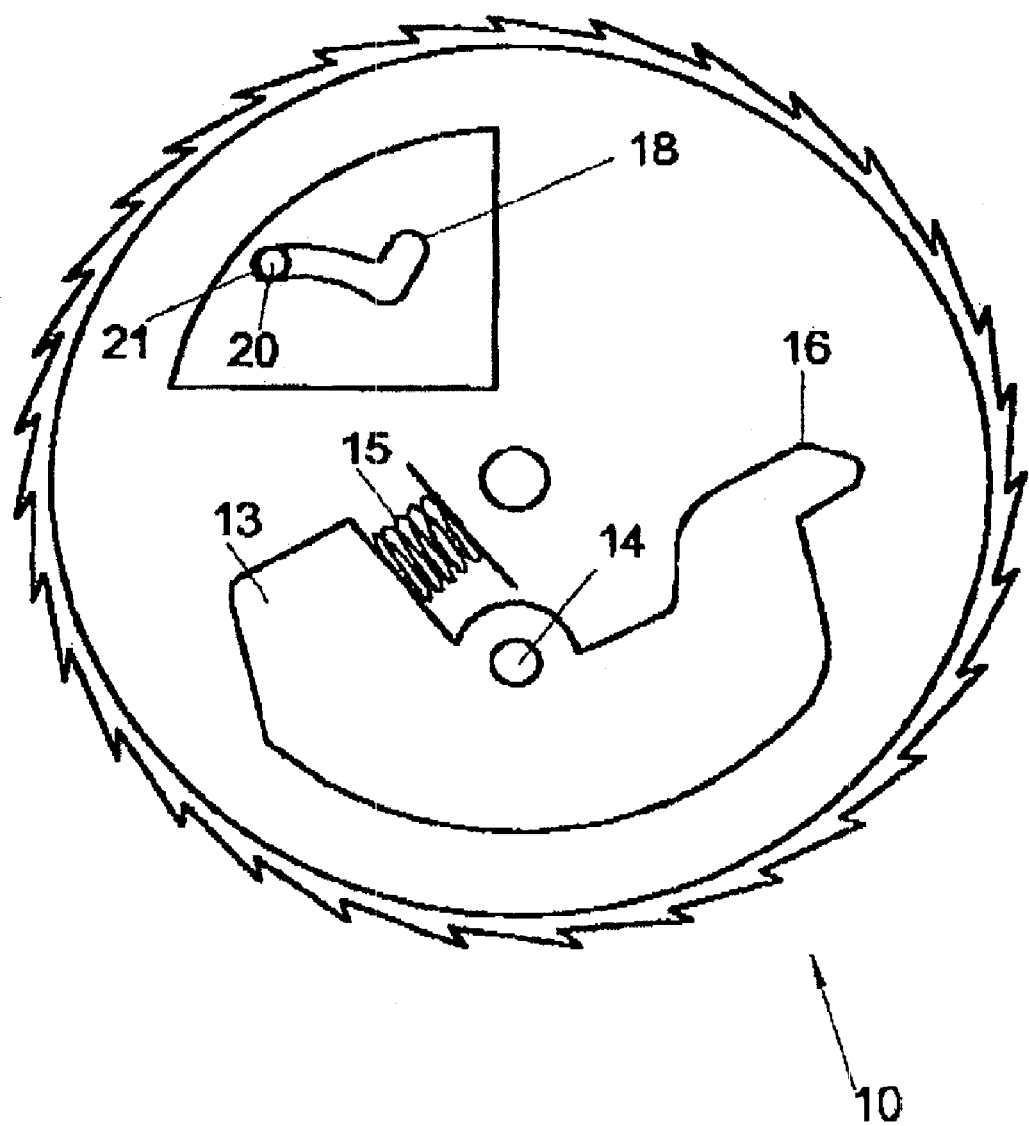

FIG. 5 likewise shows a diagrammatic front view of the ratchet wheel 10, the guide pin 20 here bearing on a radially outer stop 21 of the guide link 18. Displacement of the guide pin 20 along the link 18 is brought about by locking of the ratchet wheel 10 in relation to the flange 3, as described above. Due to the relative rotation of the flange 3 together with the first retaining pawl 4, the guide pin 20 connected to the first retaining pawl 4 is displaced in relation to the ratchet wheel 10 along the guide link 18, until the first retaining pawl 4 engages with the frame of the seat belt device and activates the belt lock.

When the belt lock is released and the seat belt is being reeled in, the first retaining pawl 4 and hence also the guide pin 20 are moved back into the starting position shown in FIG. 4 by the spring force of the said spring element acting on the first retaining pawl 4.

Figure 6:
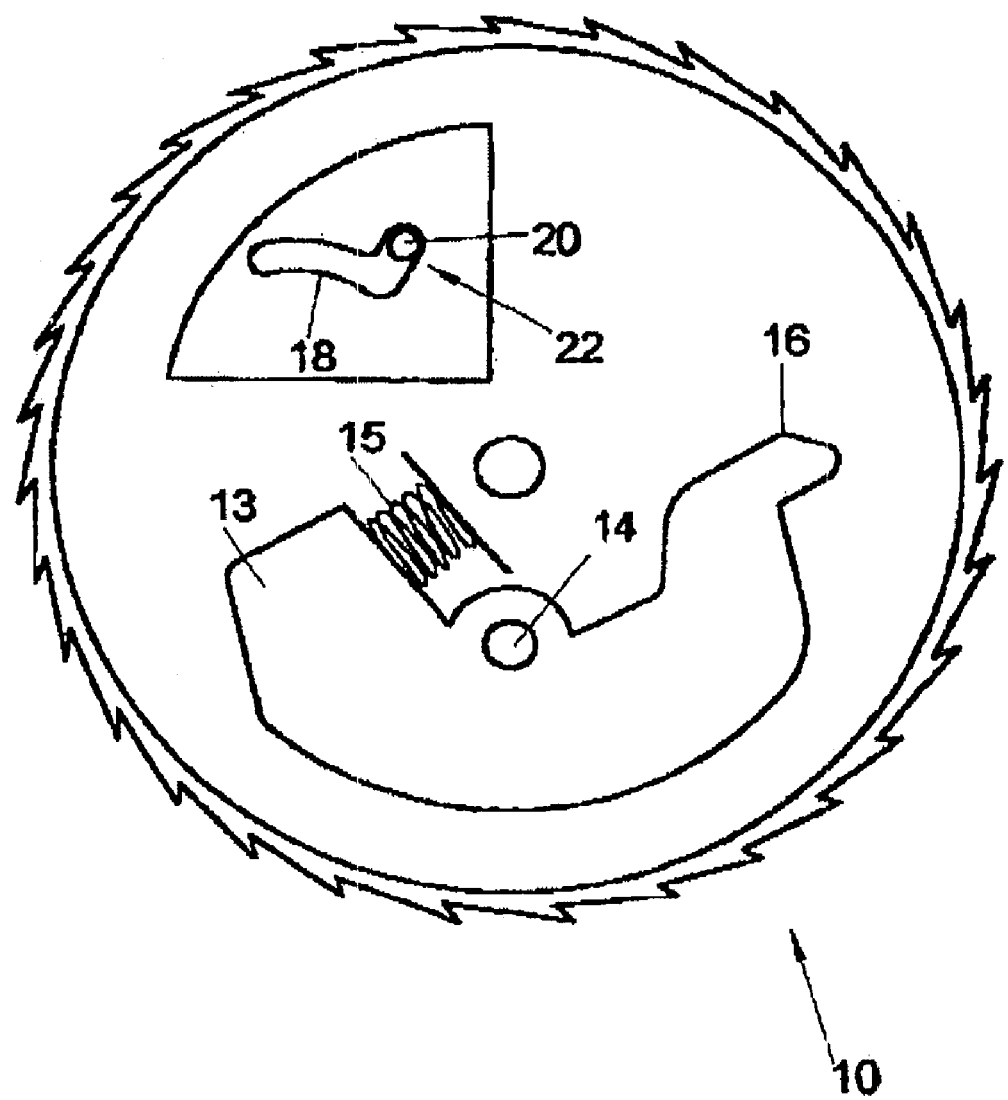

Conversely, in the event of a rapid spindle movement in the reeling direction, i.e., counterclockwise in FIGS. 3 to 5, the guide pin 20 moves in a free travel 22 (see FIG. 6) of the guide link 18, owing to the centrifugal forces acting on the said pin and on the first retaining pawl 4 connected thereto. The free travel 22 means that the first retaining pawl 4 cannot engage in the frame during the reeling movement.

As soon as the spindle 1 has come to rest again, the retaining pawl is moved into the starting position by way of the said spring element, so that the guide pin 20 also again assumes the rest position shown in FIG. 4.

Figure 7:
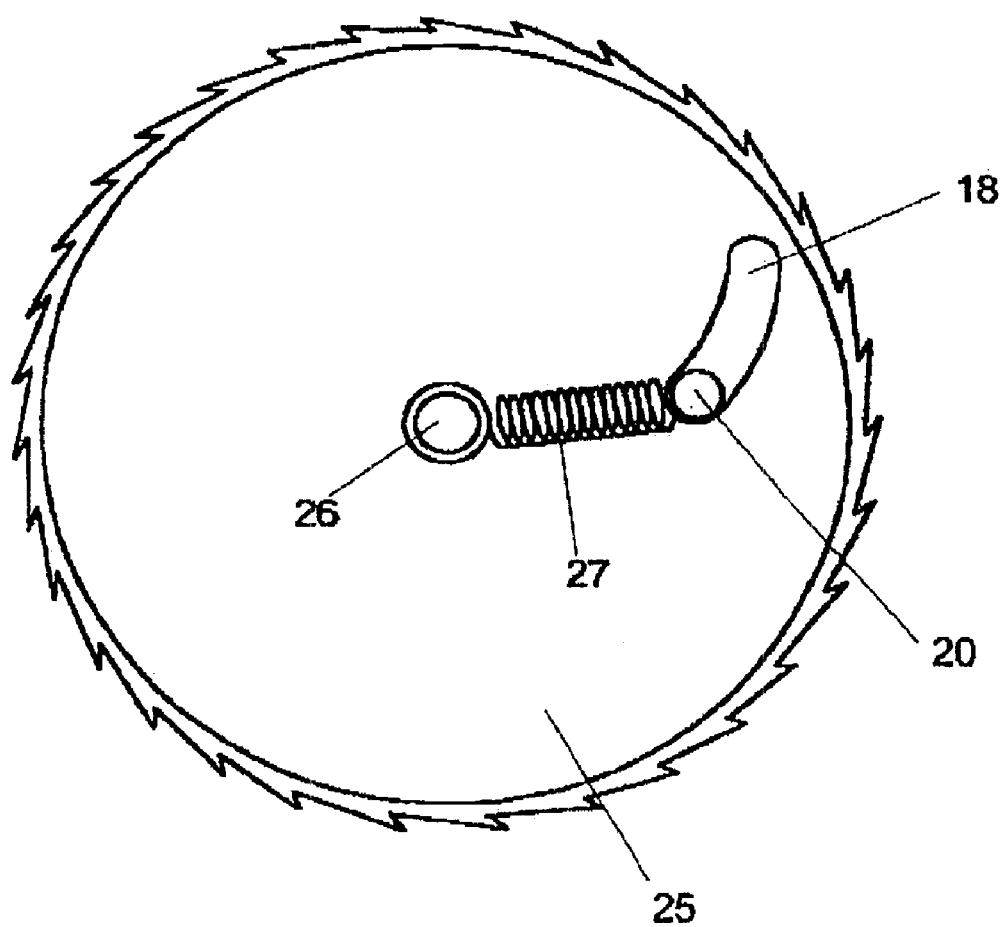
FIGS. 7 and 8 in diagrammatic form show parts of a seat belt device according to a second exemplary embodiment of the invention.
Figure 8:
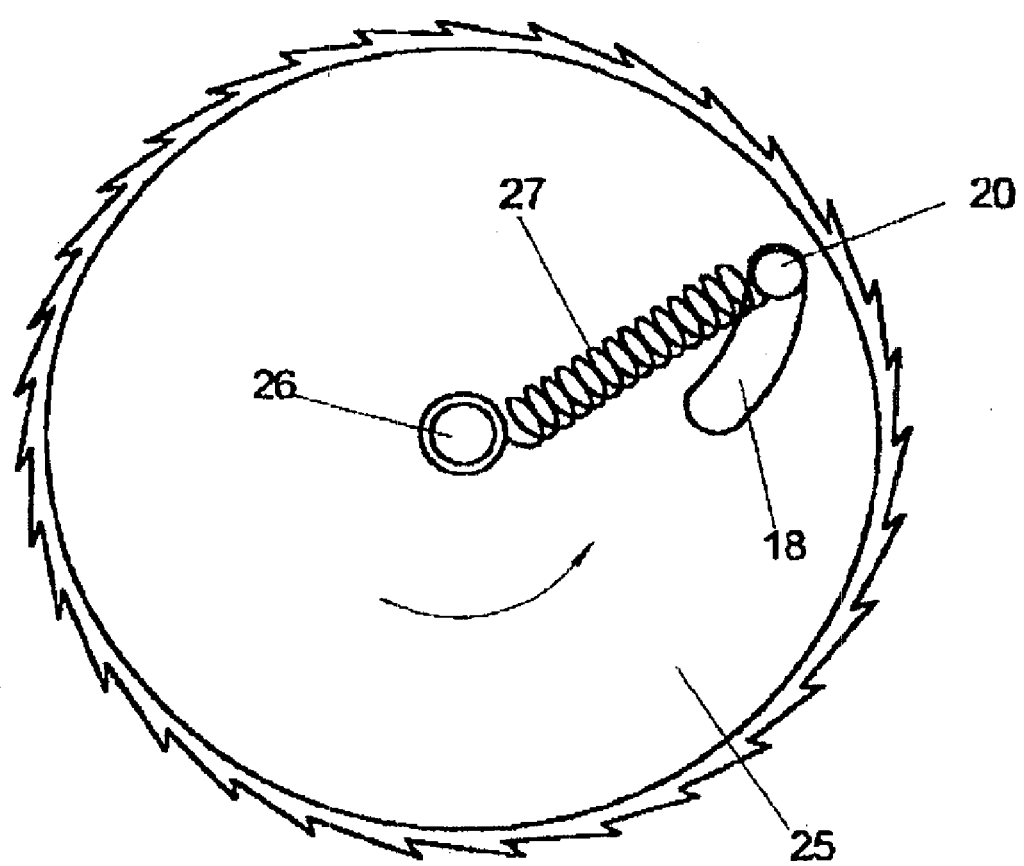

FIGS. 7 and 8 each show a part of a seat belt device according to a second exemplary embodiment of the invention. In this embodiment the ratchet wheel 10 and the wheel rim 11 are replaced by an inertial mass 25 in the form of a disk, which is rotatably supported on the spindle axis 26 and is indirectly held in its rest position by a biased spring element 27. The spring element 27 is coupled to the spindle axis 26 on one end and to the guide pin 20 on the other end.

Similar to the first embodiment, the guide pin 20 is coupled to the first retaining pawl 4 and guided in a guide link 18 in the inertial mass 25.

The spring element 27 is designed so that its spring force holds the first retaining pawl 4 and the inertial mass 25 in the rest position up to a defined angular acceleration. When the acceleration threshold is exceeded, the spindle 1 moves relative to the inertial mass 25. As a result the guide pin 20 is displaced in the guide link 18 and the first retaining pawl 4 engages in the belt frame.

This second embodiment has the advantage in that the number of components needed can be reduced, thereby reducing the costs. It requires only short engagement travel and time to lock the spindle 1. In addition, the noise generated by the first retaining pawl 4 is reduced.

Figure 9:
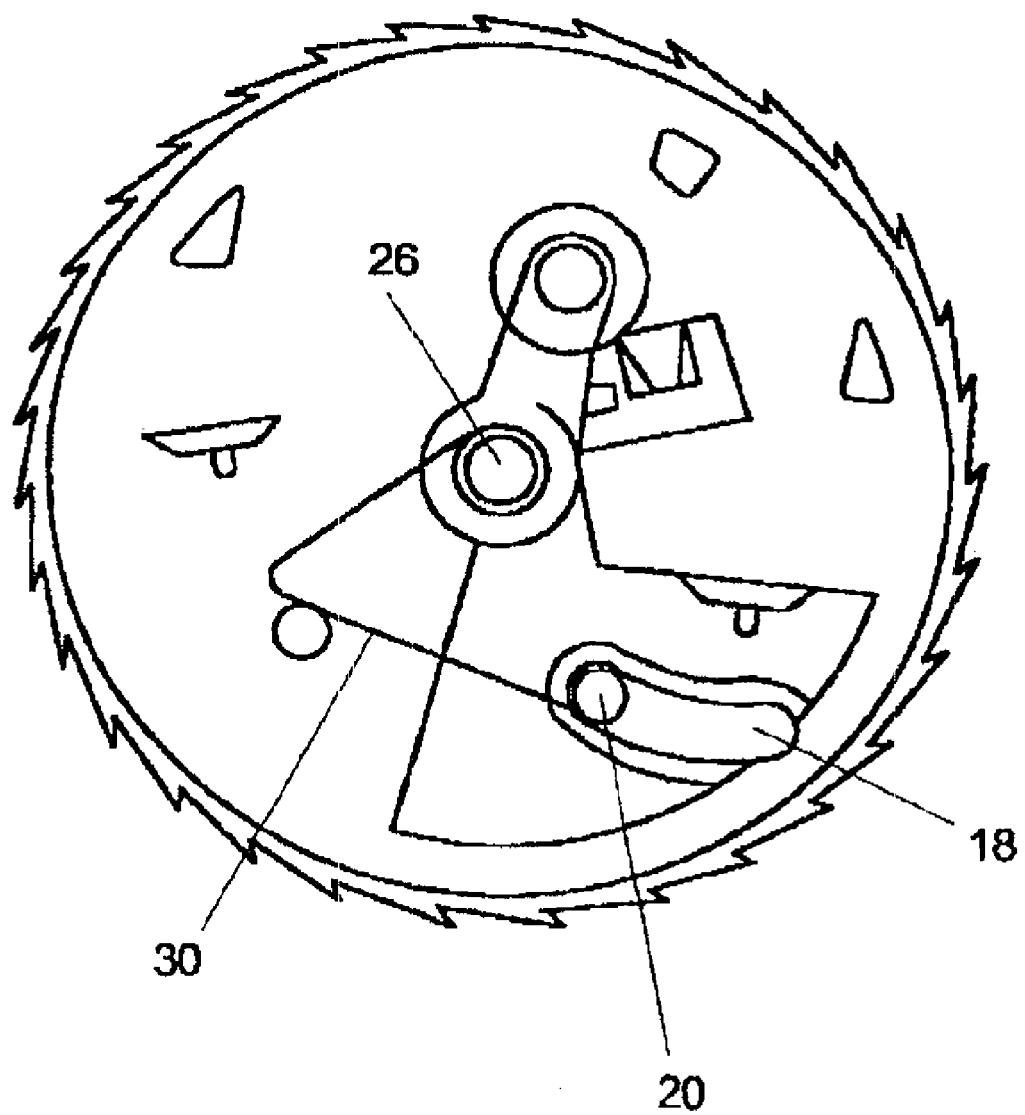
FIG. 9 in diagrammatic form shows parts of a seat belt device according to a third exemplary embodiment of the invention.

FIG. 9 shows a seat belt device according to a further exemplary embodiment of the invention. In this embodiment, the guide pin 20 is held in the rest position shown inside the guide link 18 by means of a spring clip 30. The spring clip 30 prevents free movement of the guide pin and thereby of the first retaining pawl 4, so that in addition to preventing unwanted locking of the spindle 1, any unwanted rattling of the retaining pawl 4 or of the guide pin 20 is also prevented.

The priority application, German Patent Application No. DE 102 36 858.9 filed Aug. 7, 2002, is hereby incorporated by reference herein in its entirety.

Given the disclosure of the present invention, one versed in the art-would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed:

1. A seat belt device for a vehicle having a seat belt, comprising:
   a seat belt roller arranged to be able to be rotatably fixed to a belt frame of the vehicle for reeling and unreeling of the seat belt;
   a first locking device for locking the seat belt roller in relation to the belt frame of the seat belt;
   a guide pin coupled to the first locking device; and
   a guide link, the guide pin being moveably guided inside the guide link between a first position and a second position,
   wherein the seat belt roller is locked in relation to the belt frame in the first position,
   wherein locking of the seat belt roller in relation to the belt frame is prevented in the second position, and
   wherein a movement of the guide pin into the second position is brought about by the moments of inertia of the first locking device and/or the guide pin occurring during rotation of the seat belt roller.

2. The seat belt device according to claim 1, wherein the guide pin is arranged so as to be moved into the first position or the second position according to the direction of rotation of the seat belt roller.

3. The seat belt device according to claim 2, wherein the guide pin is arranged so as to be moved into the first position when the seat belt is being unreeled, and into the second position when the seat belt is being reeled in.

4. The seat belt device according to claim 1, wherein the guide link has a free travel, in which the guide pin assumes said second position.

5. The seat belt device according to claim 1, wherein the guide link runs perpendicular to an axis of rotation of the seat belt roller.

6. The seat belt device according to claim 1, wherein the guide link comprises a longer link section and a shorter link section essentially perpendicular to the longer link section, and wherein the first position is situated at the end of the longer section opposite a junction of the sections, and wherein the second position is situated at the end of the shorter section opposite the junction of the sections.

7. The seat belt device according to claim 1, further comprising:
   a spring element holding the first locking device and the guide pin in a rest position.

8. The seat belt device according to claim 7, wherein the spring element comprises a coil spring.

9. The seat belt device according to claim 7, wherein the spring element comprises a spring clip.

10. The seat belt device according to claim 1, wherein the first locking device comprises a retaining pawl capable of engaging with a frame of the seat belt device to lock the seat belt roller.

11. A seat belt device for a vehicle having a seat belt, comprising:
    a seat belt roller arranged to be able to be rotatably fixed to a belt frame of the vehicle for reeling and unreeling of the seat belt;
    a first locking device for locking the seat belt roller in relation to the belt frame of the seat belt;
    a guide pin coupled to the first locking device;
    a guide link, the guide pin being moveably guided inside the guide link between a first position and a second position,
    a flange connected to the seat belt roller and the first locking device;
    a ratchet wheel rotatably fixed to the belt frame; and
    a second locking device, coupled to the ratchet wheel, arranged to lock the ratchet wheel in the event of a jerky unreeling of the seat belt;
    wherein the seat belt roller is locked in relation to the belt frame in the first position,
    wherein locking of the seat belt roller in relation to the belt frame is prevented in the second position,
    wherein the guide link is provided in the ratchet wheel, and the guide pin, upon locking of the ratchet wheel, is moved along the guide link towards the first position by further rotation of the flange and the first locking device, thereby causing the first locking device to lock the seat belt roller, and
    wherein the guide pin is moved towards the second position by jerky reeling in of the seat belt, thereby preventing the first locking device from locking the seat belt roller.

12. The seat belt device according to claim 11 wherein the second locking device comprises a retaining pawl, which engages with teeth of a wheel rim should a predetermined angular acceleration of the seat belt roller in the belt unreeling direction be exceeded, such that the ratchet wheel is locked in relation to the seat belt roller, and wherein the guide pin inside the guide link is moved into the first position in the event of further rotation of the seat belt roller in relation to the ratchet wheel.

13. A seat belt device for a vehicle having a seat belt, comprising:
    a seat belt roller arranged to be able to be rotatably fixed to a belt frame of the vehicle for reeling and unreeling of the seat belt;

a first locking device for locking the seat belt roller in relation to the belt frame of the seat belt;

a guide pin coupled to the first locking device;

a guide link, the guide pin being moveably guided inside the guide link between a first position and a second position, an inertial mass element capable of rotating in relation to the seat belt roller about the seat belt roller axis, and wherein the seat belt roller is locked in relation to the belt frame in the first position, and position, wherein locking of the seat belt roller in relation to the belt frame is prevented in the second position, wherein the guide link is provided in the inertial mass element, and wherein the inertial mass element is rotated in relation to the seat belt roller and the guide pin is moved in the guide link from the first position to the second position when a predetermined angular acceleration of the seat belt roller is exceeded.

* * * * *